United States Patent
Midtskogen

(10) Patent No.: US 10,110,926 B2
(45) Date of Patent: Oct. 23, 2018

(54) EFFICIENT LOOP FILTER FOR VIDEO CODEC

(71) Applicant: Cisco Technology, Inc., San Jose, CA (US)

(72) Inventor: Steinar Midtskogen, Oslo (NO)

(73) Assignee: Cisco Technology, Inc., San Jose, CA (US)

(*) Notice: Subject to any disclaimer, the term of this patent is extended or adjusted under 35 U.S.C. 154(b) by 224 days.

(21) Appl. No.: 15/016,370

(22) Filed: Feb. 5, 2016

(65) Prior Publication Data

US 2017/0111660 A1   Apr. 20, 2017

Related U.S. Application Data

(60) Provisional application No. 62/241,877, filed on Oct. 15, 2015.

(51) Int. Cl.
| | |
|---|---|
| *H04N 19/82* | (2014.01) |
| *H04N 19/51* | (2014.01) |
| *H04N 19/86* | (2014.01) |
| *H04N 19/80* | (2014.01) |
| *H04N 19/635* | (2014.01) |

(52) U.S. Cl.
CPC ........... *H04N 19/82* (2014.11); *H04N 19/51* (2014.11); *H04N 19/635* (2014.11); *H04N 19/80* (2014.11); *H04N 19/86* (2014.11)

(58) Field of Classification Search
CPC ......... H04N 19/82; H04N 19/51; H04N 19/86
USPC .................................................... 375/240.29
See application file for complete search history.

(56) References Cited

U.S. PATENT DOCUMENTS

| | | |
|---|---|---|
| 4,754,492 A | 6/1988 | Malvar |
| 4,794,455 A | 12/1988 | Ericsson |
| 5,001,560 A | 3/1991 | Ericsson |
| 6,115,503 A | 9/2000 | Kaup |
| 6,160,503 A | 12/2000 | Andrews et al. |
| 6,167,164 A | 12/2000 | Lee |

(Continued)

FOREIGN PATENT DOCUMENTS

| | | | | |
|---|---|---|---|---|
| GB | 2524477 A | * | 9/2015 | ............ H04N 19/86 |
| WO | 2012/096610 A1 | | 7/2012 | |

OTHER PUBLICATIONS

Chin-Ming Fu et al. "Sample adaptive Offset in the HEVC standard", IEEE transactions on circuits and systems for video technology, vol. 22, No. 12, 2012; Figures 1-3 and Table 1.*

(Continued)

*Primary Examiner* — Jamie Atala
*Assistant Examiner* — Ayman Abaza
(74) *Attorney, Agent, or Firm* — Edell, Shapiro & Finnan, LLC

(57) ABSTRACT

Presented herein are techniques for filtering pixels during video coding and decoding operations. Similar operations are performed at a video encoder and a video decoder. For a target pixel in a block of a video frame represented by the encoded bit-stream, a value of the target pixel is compared with neighboring pixels to produce a plurality of comparison results. A particular offset value for the target pixel is derived based on the plurality of comparison results. The target pixel is filtered using the particular offset value. This process is performed for some or all of the pixels of blocks of a video frame.

24 Claims, 7 Drawing Sheets

(56) References Cited

U.S. PATENT DOCUMENTS

| | | | |
|---|---|---|---|
| 6,215,425 B1 | 4/2001 | Andrews et al. | |
| 6,594,400 B1 | 7/2003 | Kim | |
| 6,724,944 B1 | 4/2004 | Kalevo et al. | |
| 6,907,079 B2 | 6/2005 | Gomila et al. | |
| 6,931,063 B2 | 8/2005 | Sun et al. | |
| 7,050,504 B2 | 5/2006 | Joch et al. | |
| 7,242,815 B2 | 7/2007 | Kalevo et al. | |
| 7,272,186 B2 | 9/2007 | Hong | |
| 7,388,996 B2 | 6/2008 | Lainema et al. | |
| 7,430,337 B2 | 9/2008 | Deshpande et al. | |
| 7,457,362 B2 | 11/2008 | Sankaran | |
| 7,711,054 B2 | 5/2010 | Hong | |
| 8,204,129 B2 | 6/2012 | He | |
| 8,243,795 B2 | 8/2012 | Hong | |
| 8,249,172 B2 | 8/2012 | Hong | |
| 8,380,001 B2 | 2/2013 | Zhou | |
| 2008/0089417 A1* | 4/2008 | Bao | H04N 19/176 375/240.16 |
| 2013/0022099 A1* | 1/2013 | Liu | H04N 19/46 375/240.01 |
| 2014/0003498 A1 | 1/2014 | Sullivan | |
| 2014/0064612 A1 | 3/2014 | Matsumura et al. | |
| 2015/0092863 A1 | 4/2015 | Caviedes et al. | |

OTHER PUBLICATIONS

International Search Report and Written Opinion in counterpart International Application No. PCT/US2016/056517, dated Dec. 9, 2016, 14 pages.

P. List, et al., "Adaptive Deblocking Filter", IEEE Transactions on Circuits and Systems for Video Technology, vol. 13, No. 7, Jul. 2003, 6 pages.

Chih-Ming Fu, et al., "CE8.e.1: Offset coding in SAO", Document: JCTVC-H0276, Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, XP030111303, 5 pages.

Chih-Ming Fu, et al., "Sample Adaptive Offset in the HEVC Standard", IEEE Transactions on Circuits and Systems for Video Technology, vol. 22, No. 12, Dec. 2012, 10 pages.

* cited by examiner

EFFICIENT LOOP FILTER FOR VIDEO CODEC

CROSS-REFERENCE TO RELATED APPLICATION

This application claims priority to U.S. Provisional Patent Application No. 62/241,877, filed Oct. 15, 2015, the entirety of which is incorporated herein by reference.

TECHNICAL FIELD

The present disclosure relates to video coding.

BACKGROUND

Video encoding and decoding is used to transmit and receive video content over communication networks. There are continuous efforts being made in this technology to improve the quality of the video given the bandwidth of the communication channel over which the video streams are sent. One operation performed in video coding is to correct for artifacts creating during video compression.

DESCRIPTION OF EXAMPLE EMBODIMENTS

Overview

Presented herein are techniques for filtering pixels during video coding and decoding operations. Similar operations are performed at a video encoder and a video decoder. For a target pixel in a block of a video frame represented by the encoded bit-stream, a value of the target pixel is compared with neighboring pixels to produce a plurality of comparison results. A particular offset value for the target pixel is derived based on the plurality of comparison results. The target pixel is filtered using the particular offset value. This process is performed for some or all of the pixels of blocks of a video frame.

Detailed Description

Figure 1:
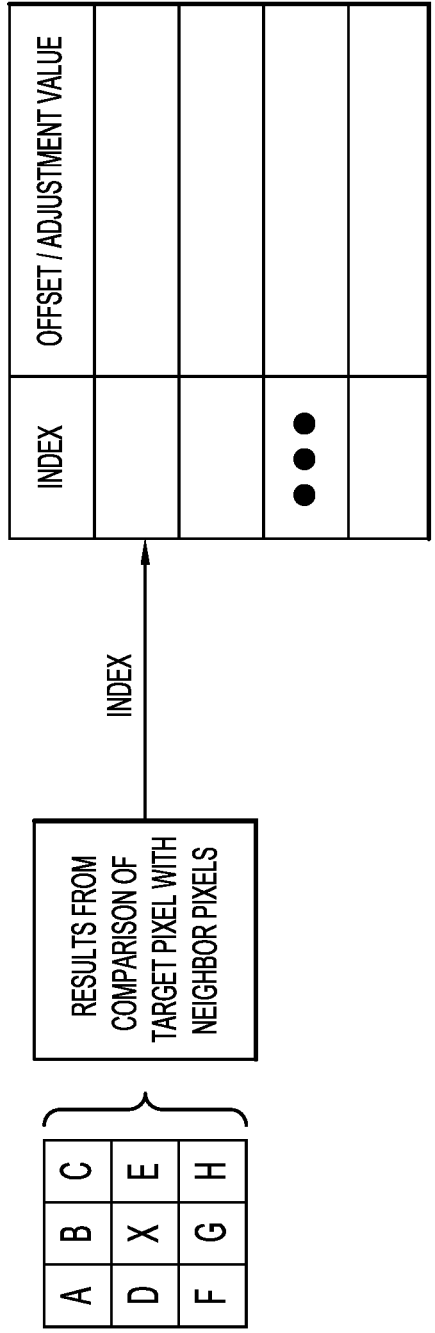
FIG. 1 is a diagram depicting loop filtering operations performed at a decoder according to an example embodiment.

Reference is first to made to FIG. 1. FIG. 1 illustrates a pixel X and its eight adjacent (neighboring) pixels A, B, C, D, E, F, G, and H ordered in the pattern as shown. In one embodiment, an index for an entry in a lookup table 10 is constructed by comparing the target pixel X with each of its neighbors and organizing the results into a number, e.g., an 8-bit binary number, such that there are $2^8$ (256) possible index values into the table 10. The table 10 is essentially a set of offset values. In other embodiments, instead of the use of the lookup table 10, computations are made according to equations based on comparison results between the target pixel and predetermined neighboring pixels that effectively operate equivalently to the lookup table 10, as described below.

For instance, the comparison of target pixel X with each of its neighbor pixels may be made according to Equation (1):

$$I=(A>X)*2^0+(B>X)*2^1+(C>X)*2^2+(D>X)*2^3+(E>X)*2^4+(F>X)*2^5+(G>X)*2^6+(H>X)*2^7,$$ Equation (1)

where X is the value of the target pixel, "(A>X)" equals "1" if the value of pixel A is greater than the value X of the target pixel and "0" otherwise, and the neighboring pixels A, B, C, D, E, F, G and H are upper diagonal right, above, upper diagonal left, left, right, lower diagonal left, below, and lower diagonal right, respectively, to the target pixel as shown in FIG. 1.

Each entry in the lookup table 10 contains an offset by which the pixel X is to be increased. In the example of Equation (1), the offset values are positive numbers by which the value X for the target pixel may be increased. If this offset is 1, it has the effect of making X more like its neighbors, thus it effectively is a low pass filter, but the offset can also be a number greater than 1, in which case X may need to be clipped into its valid range.

The same table 10 can be used when forming an index using the less-than operator instead, according to Equation (2):

$$I=(A<X)*2^0+(B<X)*2^1+(C<X)*2^2+(D<X)*2^3+(E<X)*2^4+(F<X)*2^5+(G<X)*2^6+(H<X)*2^7,$$ Equation (2)

where X is the value of the target pixel, "(A<X)" equals "1" if the value of pixel A is less than the value of X of the target pixel and "0" otherwise, and the neighboring pixels A, B, C, D, E, F, G and H are upper diagonal right, above, upper diagonal left, left, right, lower diagonal left, below, and lower diagonal right, respectively, to the target pixel as shown in FIG. 1. In this case the entries in the table are regarded as negative offsets. That is, the offset is a value by which the value X of the target pixel is to be decreased.

Figure 2:
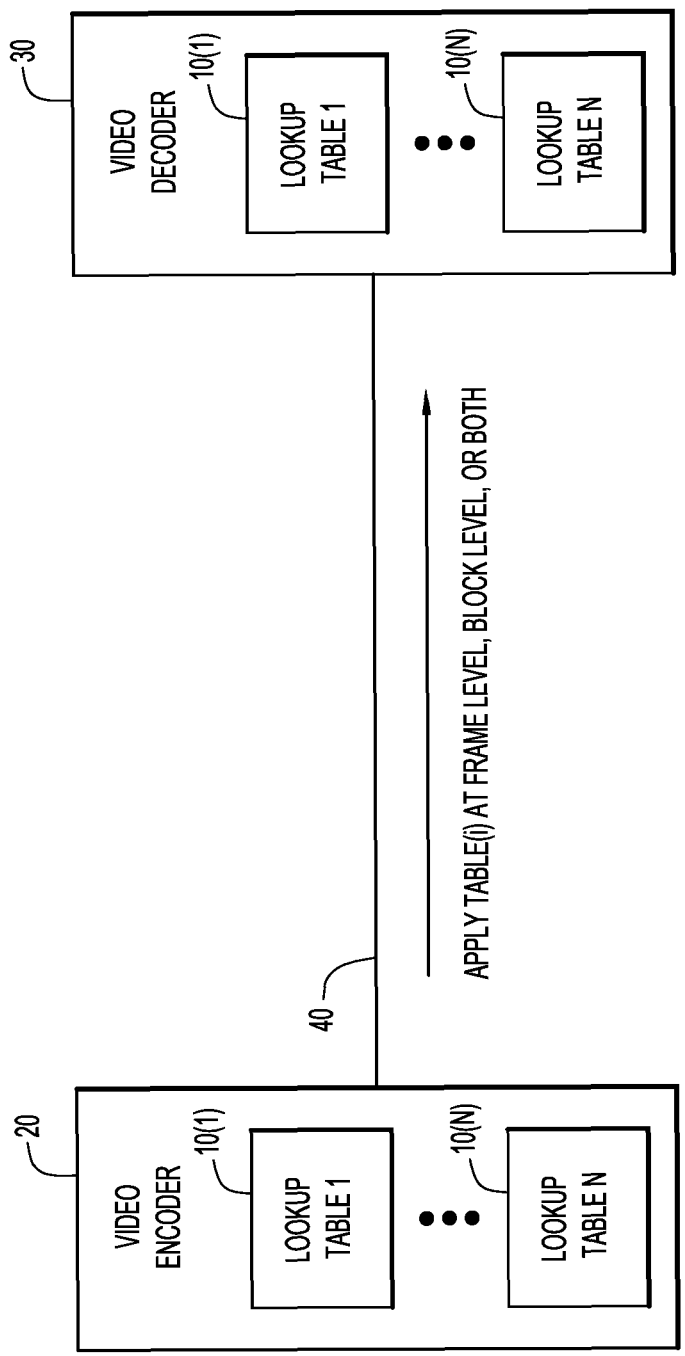
FIG. 2 is a block diagram of a video encoder and a video decoder configured to participate in the loop filtering operations, according to an example embodiment.

Turning now to FIG. 2, which shows a video encoder 20 and a video decoder 30. The video encoder 20 and the video decoder 30 communicate with each other over a communication channel 40. Both the video encoder 20 and video decoder 30 perform the pixel filtering operations described herein. The table may be shared by the encoder 20 and the decoder 30.

One way of constructing the lookup table of offset values is to try different values for a single entry, set the others to 0 and find the value that gives the best improvement, if any, based on a metric, such as a squared error metric for a set of typical video content. This process is repeated for every entry in the table. For example, a table is constructed with only one offset value at a time, by selecting an offset value for index 0 (and setting the offset values for all other indices in the table to zero), determining the improvement, then selecting an offset value for index 1 (and setting the offset values for all other indices in the table to zero), and so on. If the table has 256 entries, the offset values from −n to +n (excluding a zero offset value) are attempted and the table would be constructed in 256*2*n passes. The final table of offset values consists of the offset values that gave the best results individually.

If a neighbor pixel is outside the image frame, it may be given the same value as for pixel X. This rule can optionally be applied to block boundaries to allow blocks to be filtered independently in parallel.

The effectiveness of the filter depends on the content of the video frame and how different parts of the frame were predicted. In some cases the filter will have an adverse effect. To counter this, the encoder 20 may be configured to test the effectiveness of filtering using the offset values and signal to the decoder 30 as to whether to apply the table of offset values at the frame level or at the block level or at both the frame and block levels. This signal, at frame level, block level or both, can also indicate which table to use in a set of a plurality of different tables shown at 10(1)-10(N) shared by the encoder 20 and decoder 30. A set of tables could be condensed into one table made up of only 0's and 1's and the signal could be a scale factor to be applied to the entries of one table, which would eliminate the need for storing multiple tables at the decoder 30.

To reduce the signaling cost, at the block level the encoder 20 can disable the use of the filter lookup table implicitly for certain block types for which the filter is expected to have little or sometimes adverse effects, such as for blocks without residual information or for bi-predictive blocks (since the bi-predictive averaging have low pass properties). In that case, a signal only has to be transmitted to trigger use of the filter table for certain blocks.

Some simplifications can be made by which the particular offset value is derived for a given target pixel to simple equations that are based on a sum of comparison results between a value of the target pixel with a value for each of predetermined neighboring pixels, wherein the comparison result is based on any one of: greater than, less than, equal to, greater than or equal to, less than or equal to, wherein each comparison result is assigned a "1" or a "0" for purposes of computing the sum. In one example, filtering may be performed according to as the equation:

$$X'=X+((B>X)+(D>X)+(E>X)+(G>X)>2)-((B<X)+(D<X)+(E<X)+(G<X)>2), \quad \text{Equation (3)}$$

where X is the value of the target pixel, and B, D, E and G are values for neighboring pixels above, to the left, to the right, and below, respectively, the target pixel as shown in FIG. 1, where (Y>X) equals "1" if the value of pixel Y is greater than X and "0" otherwise, and (Y<X) equals "1" if the value of pixel Y is less than X and "0" otherwise, and ((B>X)+(D>X)+(E>X)±(G>X)>2) equals "1" if the ((B>X)+(D>X)+(E>X)+(G>X) is greater than 2 and "0" otherwise, and ((B<X)+(D<X)+(E<X)+(G<X)>2) equals "1" if ((B<X)+(D<X)+(E<X)+(G<X) is less than 2 and "0" otherwise, and X' is a filtered value of the target pixel. This covers all tables having "1" for the entries at indices 26, 74, 82, 88, 90.

That is, Equation (3) combines possible offset increases obtainable from Equation (1) and possible offset decreases obtainable from Equation (2) into a single equation since it can give both a negative or a positive result. In Equations (1) and (2), a breakdown can be made:
(B>X) and (B<X) can add $2^1=2$ to the index (D>X) and (D<X) can add $2^3=8$ to the index (E>X) and (E<X) can add $2^4=16$ to the index (G>X) and (G<X) can add $2^6=64$ to the index. That gives 16 combinations for the index, but since at least three is needed to make the (">2") part to be true, only 5 combinations remain. If the 4 bit binary numbers from 0 to 15 and only those with at least three 1's are kept, 5 numbers are obtained:
0111
1011
1101
1110

Replacing each bit with 2, 8, 16 and 64 respectively gives:

$$0*2^1+1*2^3+1*2^4+1*2^6=8+16+64=88$$

$$1*2^1+0*2^3+1*2^4+1*2^6=2+16+64=82$$

$$1*2^1+1*2^3+0*2^4+1*2^6=2+8+64=74$$

$$1*2^1+1*2^3+1*2^4+0*2^6=2+8+16=26$$

$$1*2^1+1*2^3+1*2^4+1*2^6=2+8+16+64=90$$

Equation 1 and 2 can be combined into a positive part and a negative part of Equation 3 because (B>X) is mutually exclusive with (B<X), and so on. This means that if the positive part is true (evaluating into 1), the negative part is false (evaluating into 0), and vice versa (but both the positive and negative part can be false, giving 0—no modification to the target pixel).

Equation 3 can be expressed by way of one or more lookup tables, as described above. However, Equation 3 is a particularly efficient special case of the more general concepts described herein.

Furthermore, when using lookup tables or equivalent equations, the compare operation may be generalized. That is, while the foregoing describes comparisons such as (A>X) and (A<X), other types of comparisons may be made such as (A==X), (A>=X), (A<=X) (A>X+1), (A>X+2), etc., and as well as comparisons between neighboring pixels such as (A<B), (A<C), etc., in determining the offset value or the index into a table of offset values. This could yield many combinations. Thus, a table lookup index may be derived by a combination of any comparison between any pixels, and an offset value may be computed by equivalent equations.

The computational complexity can be reduced and the parallelism can be increased, at a slight loss of compression effectiveness, if implicit signaling, the aforementioned block parallelism and the computation of Equation (3) are used. In that case, it is merely necessary for a binary signal (on/off) at the frame level and for each block for which the offset values are to be used.

Figure 3:
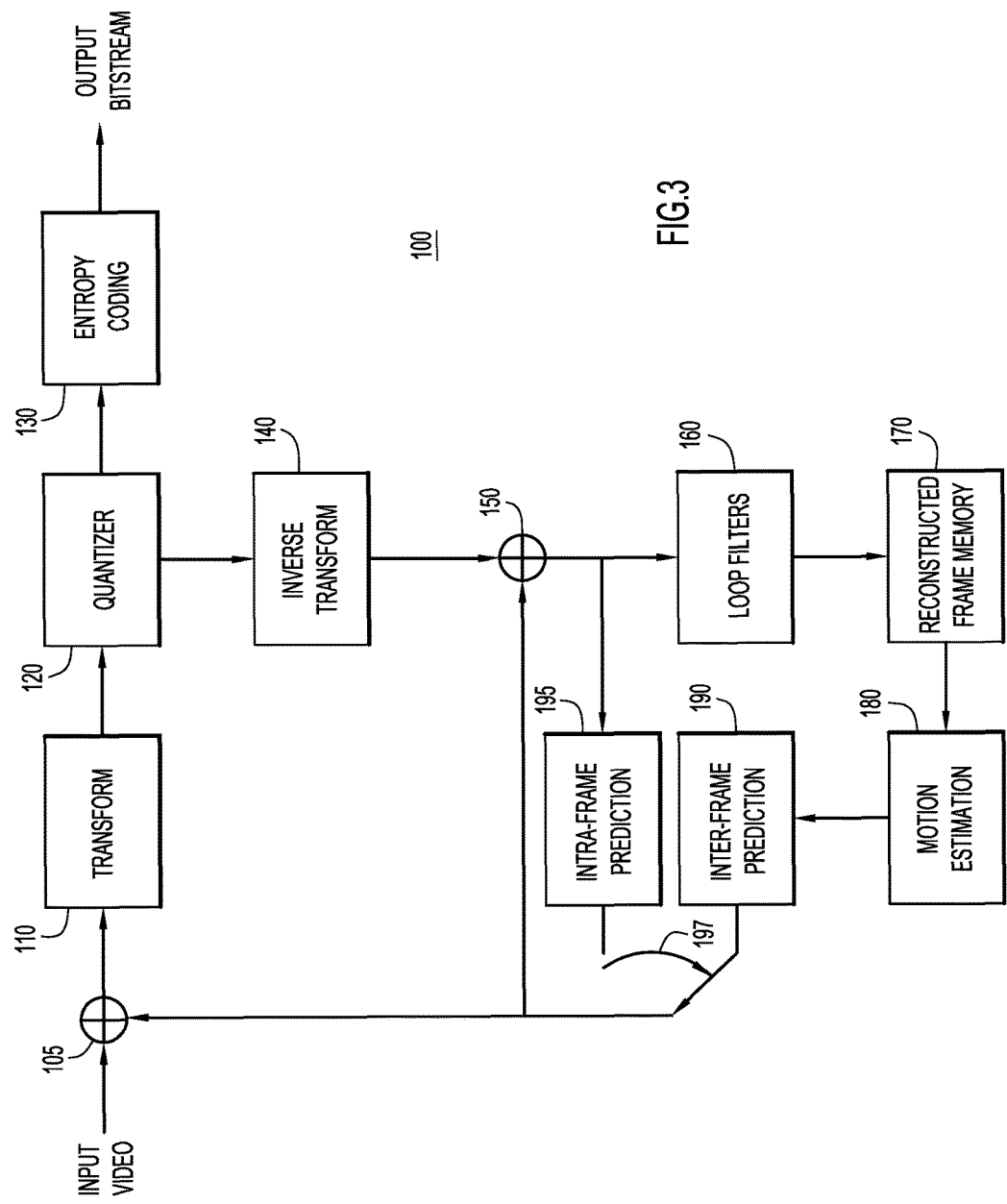
FIG. 3 is a block diagram of a video encoder configured to use the loop filter presented herein, according to an example embodiment.

Referring first to FIG. 3 a block diagram of a video encoder is shown at reference numeral 100. The video encoder 100 is configured to perform the filter techniques presented herein. The video encoder 100 includes a subtractor 105, a transform unit 110, a quantizer unit 120, an entropy coding unit 130, an inverse transform unit 140, an adder 150, one or more loop filters 160, a reconstructed frame memory 170, a motion estimation unit 180, an inter-frame prediction unit 190, an intra-frame prediction unit 195 and a switch 197. The one or more loop filters 160 remove blocking and transform coding artifacts to improve visual quality and better support prediction processing.

A current frame (input video) as well as a prediction frame are input to a subtractor 105. The subtractor 105 is provided with input from either the inter-frame prediction unit 190 or intra-frame prediction unit 195, the selection of which is controlled by switch 197. Intra-prediction processing is selected for finding similarities within the current image frame, and is thus referred to as "intra" prediction. Motion compensation has a temporal component and thus involves analysis between successive frames that is referred to as "inter" prediction. The motion estimation unit 180 supplies a motion estimation output as input to the inter-frame prediction unit 190. The motion estimation unit 180 receives as input the input video and an output of the reconstructed frame memory 170.

The subtractor 105 subtracts the output of the switch 197 from the pixels of the current frame, prior to being subjected to a two dimensional transform process by the transform unit 110 to produce transform coefficients. The transform coefficients are then subjected to quantization by quantizer unit 120 and then supplied to entropy coding unit 130. Entropy coding unit 130 applies entropy encoding in order to remove redundancies without losing information, and is referred to as a lossless encoding process. Subsequently, the encoded data is arranged in network packets via a packetizer (not shown), prior to be transmitted in an output bit stream.

The output of the quantizer unit 120 is also applied to the inverse transform unit 140 and used for assisting in prediction processing. The adder 150 adds the output of the inverse transform unit 140 and an output of the switch 197 (either the output of the inter-frame prediction unit 190 or the intra-frame prediction unit 195). The output of the adder 150 is supplied to the input of the intra-frame prediction unit 195 and to one or more loop filters 160 which suppress some of the sharpness in the edges to improve clarity and better support prediction processing. One of the loop filters 160 is configured as described above in connection with FIG. 1. It can be applied before, after or in between any other loop filters. The lookup table referred to above is generated and maintained by the loop filters 160. The output of the loop filters 160 is applied to a reconstructed frame memory 170 that holds the processed image pixel data in memory for use in subsequent motion processing by motion estimation block 180.

Figure 4:
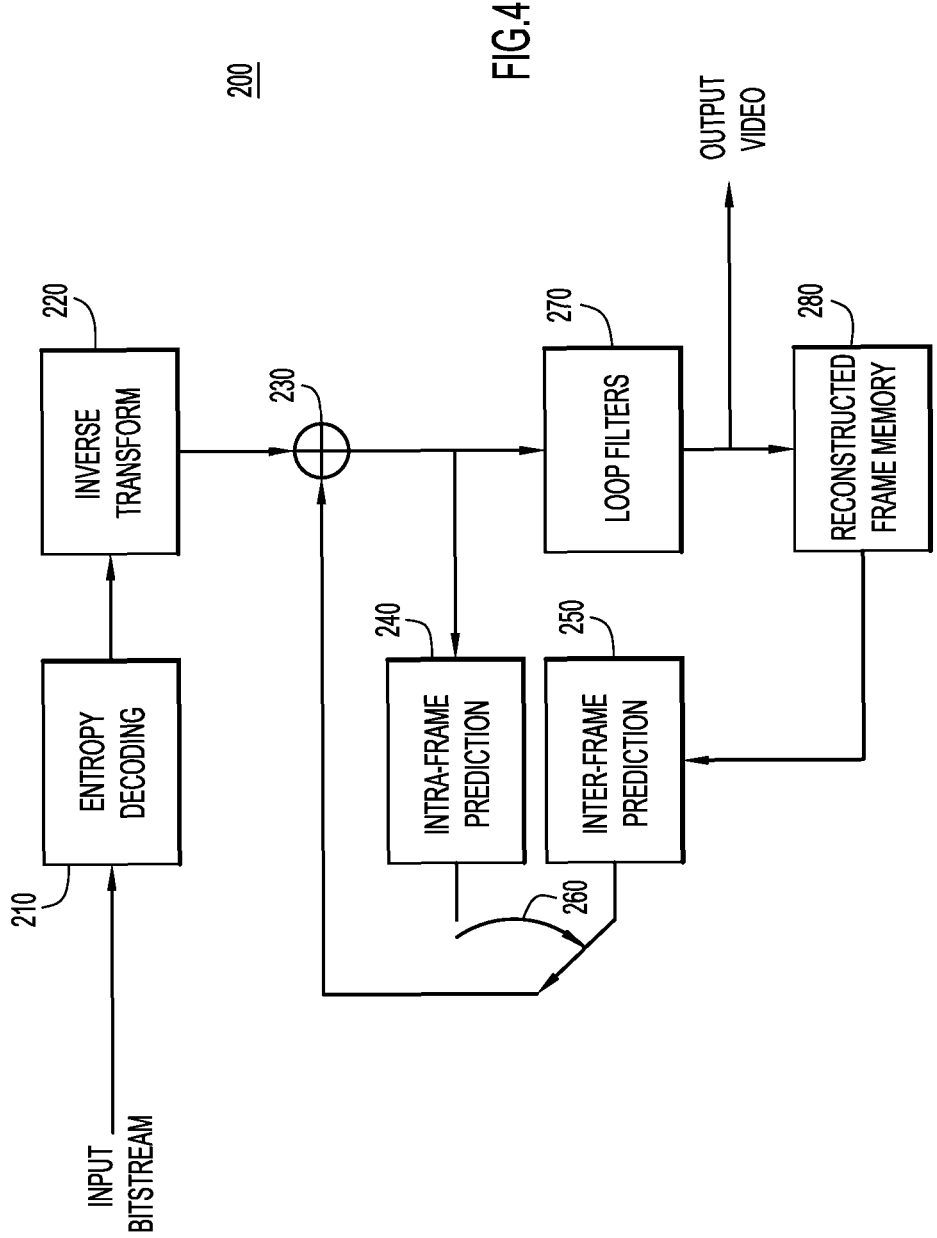
FIG. 4 is a block diagram of a video decoder configured to use the loop filter presented herein, according to an example embodiment.

Turning to FIG. 4, a block diagram of a video decoder is shown at reference numeral 200. The video decoder 200 includes an entropy decoding unit 210, an inverse transform unit 220, an adder 230, an intra-frame prediction unit 240, an inter-frame prediction unit 250, a switch 260, one or more loop filters 270 and a reconstructed frame memory 280. One of the loop filters 270 is configured as described above in connection with FIG. 1. The order of the filters must agree with the order used in the encoder. The lookup table referred to above is generated and maintained by the loop filters 270. The entropy decoding unit 210 performs entropy decoding on the received input bitstream to produce quantized transform coefficients which are applied to the inverse transform unit 220. The inverse transform unit 220 applies two-dimensional inverse transformation on the quantized transform coefficients to output a quantized version of the difference samples. The output of the inverse transform unit 220 is applied to the adder 230. The adder 230 adds to the output of the inverse transform unit 220 an output of either the intra-frame prediction unit 240 or inter-frame prediction unit 250. The loop filters 270 operate similar to that of the loop filters 160 in the video encoder 100 of FIG. 2. An output video image is taken at the output of the loop filters 270.

The video encoder 100 of FIG. 3 and the video decoder of FIG. 4 may be implemented by digital logic gates in an integrated circuit (e.g., by an application specific integrated circuit) or by two or more separate logic devices. Alternatively, the video encoder 100 and video decoder 200 may be implemented by software executed by one or more processors, as described further in connection with FIG. 4, below.

Each of the functional blocks in FIGS. 3 and 4 are executed for each coding block, prediction block, or transform block. Block 160 in FIG. 3 and block 270 in FIG. 4 are the components that are involved in the loop filtering embodiments presented herein.

Figure 5:
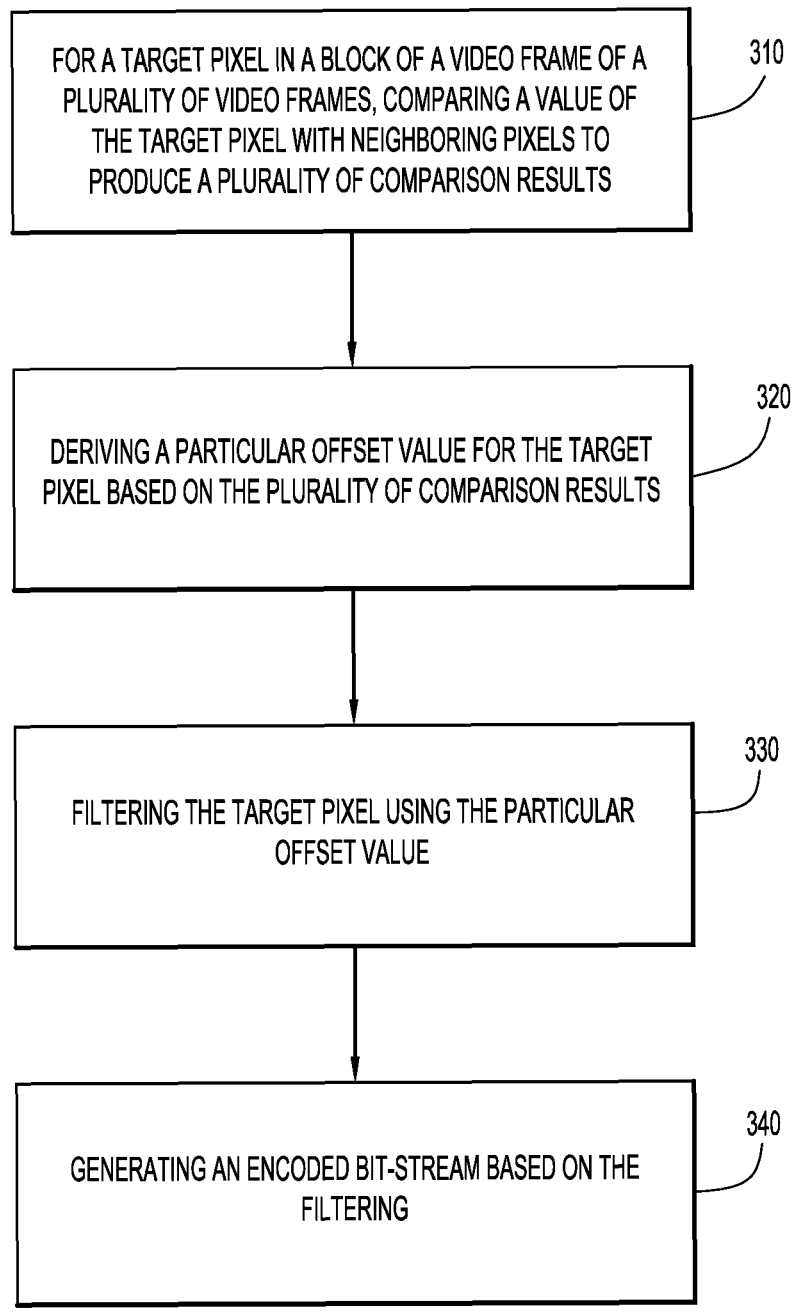
FIG. 5 is a flow chart depicting operations performed at a video encoder, according to an example embodiment.

Reference is now made to FIG. 5. Reference is made to FIGS. 1 and 2 for purposes of the description of FIG. 5. FIG. 5 illustrates a flow chart for a method 300 performed at an encoder, such as an encoder shown in FIG. 3. At 310, for a target pixel in a block of a video frame, a comparison is made of a value of the target pixel with neighbor pixels to produce a plurality of comparison results. At 320, the encoder derives a particular offset value for the target pixel based on the plurality of comparison results. At 330, the encoder filters the target pixel using the particular offset value. At 340, an encoded bit-stream is generated using an output of the filtering step 330. It should be understood that the operations 310-330 are performed for each of a plurality of target pixel in a block of a video frame. All pixels in the block of the video frame may be filtered in this manner, or a subset of all pixels in the block may be filtered in this manner.

As explained above, deriving the particular offset value for the target pixel may involve generating an index into stored data of offset values based on the plurality of comparison results, and retrieving the particular offset value from the stored data using the index. Moreover, generating the index may involve generating a multi-bit binary number, each bit of the binary number corresponding to a comparison result between the target pixel and a corresponding one of its neighboring pixels. Alternatively, deriving the particular offset value may involve computing the particular offset value for the target pixel based on a sum of comparison results between a value of the target pixel with a value for each of predetermined neighboring pixels, wherein the comparison result is based on any one of: greater than, less than, equal to, greater than or equal to, less than or equal to, wherein each comparison result is assigned a "1" or a "0" for purposes of computing the sum.

As described above in connection with FIGS. 1 and 2, the encoder may send to the decoder a signal that indicates to the decoder which particular set of a plurality of sets of offset values the decoder is to use. In another embodiment, the signal sent from the encoder to the decoder indicates to the decoder a scale factor to be applied to offset values for use in filtering pixels.

Furthermore, the encoder may test an effectiveness of the offset values, and the signal sent from the encoder to the decoder is based on the effectiveness of the offset values. The signal sent from the encoder to the decoder may be configured to disable the use of the filtering based on the stored data for certain block types, again, according to the effectiveness of the offset values determined at the encoder. Moreover, the encoder may send the signal to the encoder only when it is needed to trigger use at the decoder of the stored data for certain blocks of a video frame.

Further still, in one example embodiment described above, the decoder stores data for a single set of offset values consisting of only 0's and 1's, and the signal sent from the encoder indicates to the decoder whether or not to perform filtering at the frame level, and the signal further indicates a scale factor to be applied to the set of offset values prior to filtering by the decoder.

Figure 6:
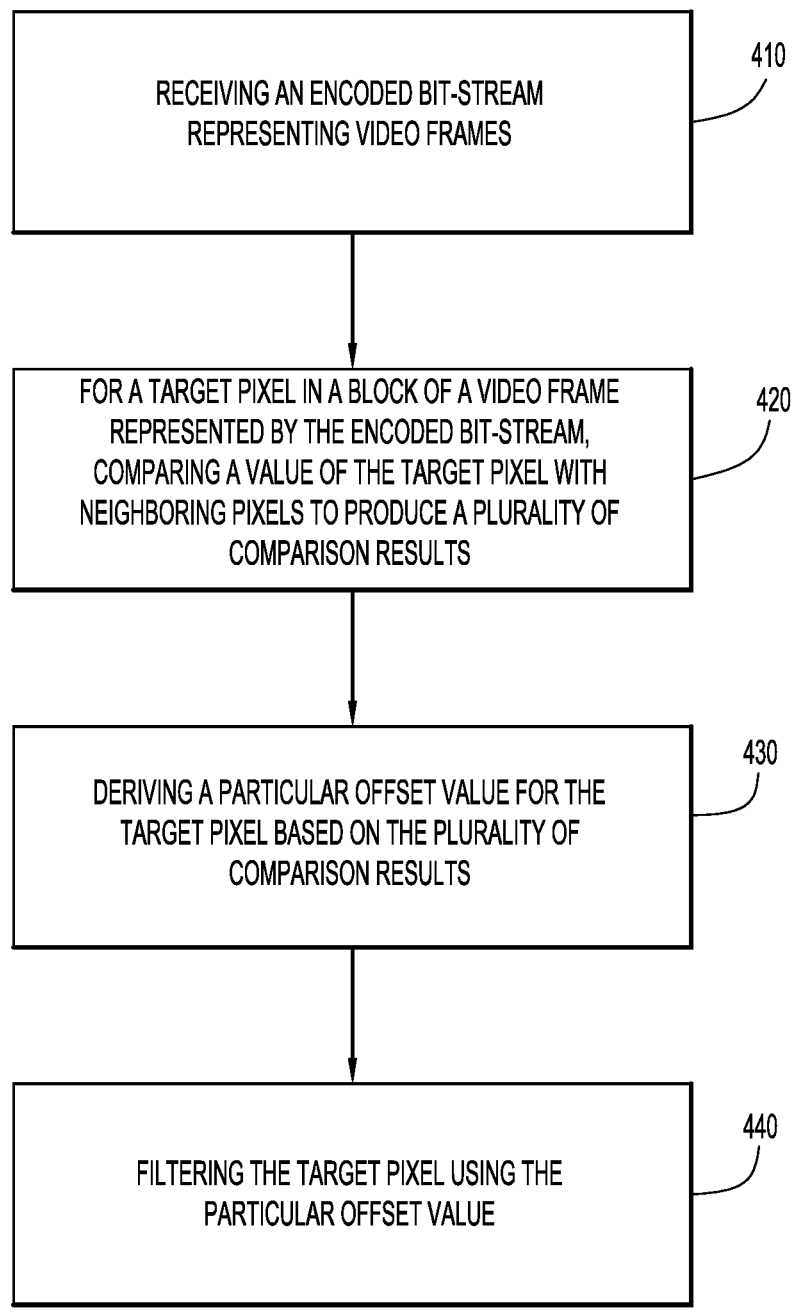
FIG. 6 is a flow chart depicting operations performed at a video decoder, according to an example embodiment.
Figure 7:
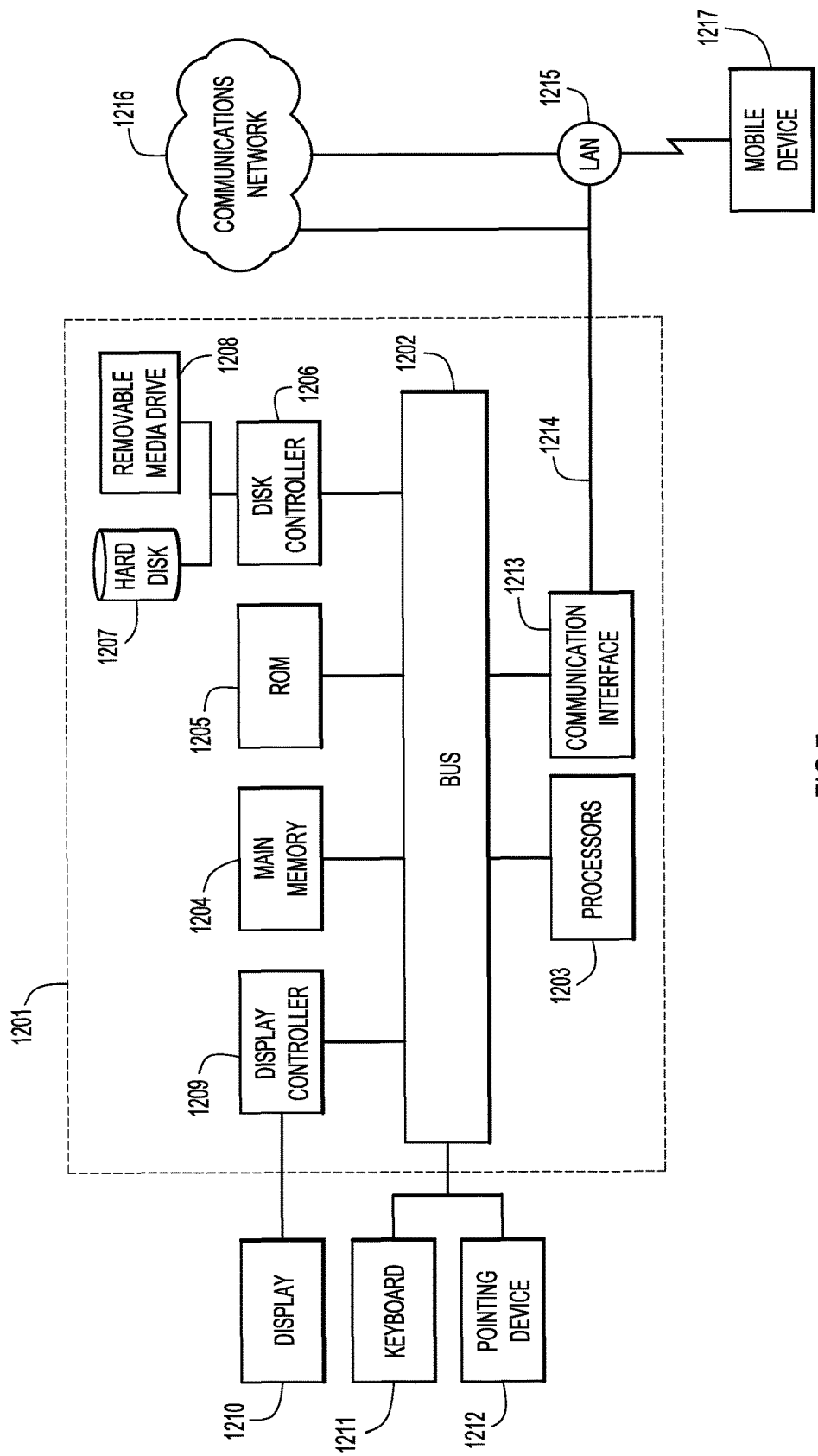
FIG. 7 is a block diagram of a computing system in which the video encoding and/or video decoding operations may be performed, according to an example embodiment.

Turning now to FIG. 6, a flow chart is described for a method 400 performed at a decoder, such as a decoder shown in FIG. 4. At 410, the decoder receives from an encoder an encoded bit-stream representing video frames. At 420, for a target pixel in a block of a video frame represented by the encoded bit-stream, the decoder compares a value of the target pixel with neighboring pixels to produce a plurality of comparison results. At 430, the decoder generates an index into stored data of offset values to be applied to the target pixel based on the plurality of comparison results. At 440, the decoder filters the target pixel using the particular offset value. It should be understood that this process is performed, as needed, for some or all pixels in blocks of video frames.

As described above in connection with FIGS. 1 and 2, deriving the offset value for the target pixel comprises generating an index into stored data of offset values based on the plurality of comparison results, and retrieving the particular offset value from the stored data using the index. The index may be a multi-bit binary number, each bit of the multi-bit binary number corresponding to a comparison result between the target pixel and a corresponding one of its neighboring pixels. There are several ways to generate the index. One way involves comparing the value for the target pixel with neighboring pixels to generate an 8-bit binary number according to the equation: Index=(A>X)*$2^0$+(B>X)*$2^1$+(C>X)*$2^2$+(D>X)*$2^3$+(E>X)*$2^4$+(F>X)*$2^5$+(G>X)*$2^6$+(H>X)*$2^7$, where X is value of the target pixel, A, B, C, D, E, F, G and H are values for adjacent neighboring pixels at upper diagonal right, above, upper diagonal left, left, right, lower diagonal left, below, and lower diagonal right, respectively, to the target pixel, and "(Y>X)" equals "1" if the value of pixel Y is greater than the value X of the target pixel and "0" otherwise, where Y is the value of pixels A, B, C, D, E, F, G and H. In this case, the offset values are positive numbers by which the value X of the target pixel may be increased.

Another way involves comparing the value for the pixel with each of its neighboring pixels to generate an 8-bit binary number according to the equation: Index=(A<X)*$2^0$+(B<X)*$2^1$+(C<X)*$2^2$+(D<X)*$2^3$+(E<X)*$2^4$+(F<X)*$2^5$+(G<X)*$2^6$+(H<X)*$2^7$, wherein X is the value of the target pixel and A, B, C, D, E, F, G and H are values for neighboring pixels at upper diagonal right, above, upper diagonal left, left, right, lower diagonal left, below, and lower diagonal right, respectively to the target pixel, and "(Y<X)" equals "1" if the value of pixel A is less than the value X of pixel of the target pixel and "0" otherwise, where Y is the value of pixels A, B, C, D, E, F, G and H. In this case, the offset values are negative offset values by which the value X of the target pixel may be decreased.

In still another embodiment, deriving the particular offset value involves computing the particular offset value for the target pixel based on a sum of comparison results between a value of the target pixel with a value for each of predetermined neighboring pixels, wherein the comparison result is based on any one of: greater than, less than, equal to, greater than or equal to, less than or equal to, wherein each comparison result is assigned a "1" or a "0" for purposes of computing the sum. For example, the filtering step 440 may involve performing a computation using the equation: X'=X+((B>X)+(D>X)+(E>X)+(G>X)>2)−((B<X)+(D<X)+(E<X)+(G<X)>2), where X is the value of the target pixel and B, D, E, and G are values for the neighboring pixels above, to the left, to the right and below, respectively, to the target pixel, wherein (Y>X) equals "1" if the value of pixel Y is greater than X and "0" otherwise, and (Y<X) equals "1" if the value of pixel Y is less than X and "0" otherwise, where Y is the value of pixels B, D, E and G, and ((D>X)+(E>X)+(G>X)>2) equals "1" if ((D>X)+(E>X)+(G>X)) is greater than 2 and "0" otherwise, and ((B<X)+(D<X)+(E<X)+(G<X)>2) equals "1" if ((B<X)+(D<X)+(E<X)+(G<X)) is less than 2 and "0" otherwise, and X is a filtered value of the target pixel. In this case, the stored data comprises a single set of offset values consisting of only 0's and 1's. This is equivalent to a table of offset values having 1 for the entries at indices 26, 74, 82, 88, 90, and 0 for all other indices, as described above.

The operations at the decoder may be dependent on signaling from the encoder. In one form, the decoder receives from the encoder a signal that indicates to the decoder whether to apply the offset values at a frame level or at a block level, or at both the frame level and the block level. In another form, the decoder stores data for a plurality of sets of offset values, and the decoder receives from the encoder a signal that indicates which particular set of the plurality of sets of offset values to use. In still another form, the decoder stores data for a single set of offset values consisting of only 0's and 1's, and the decoder receives from the encoder a signal indicating a scale factor to be applied to the single set of offset values prior to the decoding filtering pixels.

In still another form, the encoder tests an effectiveness of the offset values, and wherein the signal sent from the encoder to the decoder is based on the effectiveness of the offset values, and at least the filtering step 440 is based on the signal received from the encoder. For example, the signal sent from the encoder to the decoder is configured to disable the use of the filtering based on the stored data for certain types of blocks of video frames. The encoder may send this signal only when to trigger use at the decoder of the stored data of offset values for certain blocks of video frames.

In one particular embodiment, the decoder performs the filtering operation 440 according to Equation (3). In this case, the stored data comprises a single set of offset values consisting of only 0's and 1's, and the signal sent from the encoder indicates to the decoder whether or not to perform the filtering at the frame level. The signal may further indicate a scale factor to be applied to the set of offset values prior to the filtering.

In still another embodiment, deriving the particular offset value involves computing the particular offset value for the target pixel based on a sum of comparison results between a value of the target pixel with a value for each of predetermined neighboring pixels, wherein the comparison result is based on any one of: greater than, less than, equal to, greater than or equal to, less than or equal to, wherein each comparison result is assigned a "1" or a "0" for purposes of computing the sum. For example, the filtering step 440 may involve performing a computation using the equation: X'=X+((B>X)+(D>X)+(E>X)+(G>X)>2)−((B<X)+(D<X)+(E<X)+(G<X)>2), where X is the value of the target pixel and B, D, E, and G are values for the neighboring pixels above, to the left, to the right and below, respectively, to the target pixel, wherein (Y>X) equals "1" if the value of pixel Y is greater than X and "0" otherwise, and (Y<X) equals "1" if the value of pixel Y is less than X and "0" otherwise, where Y is the value of pixels B, D, E and G, and ((B>X)+(D>X)+(E>X)+(G>X)>2) equals "1" if the ((B>X)+(D>X)+(E>X)+(G>X)) is greater than 2 and "0" otherwise, and ((B<X)+(D<X)+(E<X)+(G<X)>2) equals "1" if ((B<X)+(D<X)+(E<X)+(G<X)) is less than 2 and "0" otherwise, and X is a filtered value of the target pixel. In this case, the stored data comprises a single set of offset values consisting of only 0's and 1's. This covers all tables having "1" for the entries at indices 26, 74, 82, 88, 90.

The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 1201 may also include a display controller 1209 coupled to the bus 1202 to control a display 1210, such as a cathode ray tube (CRT), for displaying information to a computer user. The computer system 1201 includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a wired or wireless network interface card to attach to any packet switched (wired or wireless) LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local are network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

In summary, loop filter methods are provided in which each pixel gets adjusted according to a lookup table whose index is constructed from combining binary results of comparisons of the pixel and its neighboring pixels. In many cases the lookup table can be reduced to simple equations. This filter is very well suited for Single Instruction/Multiple Data (SIMD) instructions, making it easy to make extremely efficient implementations using the most common CPUs (x86, ARM) or in hardware.

In one form, a method is provided comprising: receiving at a decoder from an encoder an encoded bit-stream representing video frames; for a target pixel in a block of a video frame represented by the encoded bit-stream, comparing a value of the target pixel with neighboring pixels to produce a plurality of comparison results; deriving a particular offset value for the target pixel based on the plurality of comparison results; and filtering the target pixel using the particular offset value.

In another form, an apparatus is provided comprising a network interface unit configured to enable network communications; and a processor configured to: receive from an encoder an encoded bit-stream representing video frames; for a target pixel in a block of a video frame represented by the encoded bit-stream, compare a value of the target pixel with neighboring pixels to produce a plurality of comparison results; derive a particular offset value for the target pixel based on the plurality of comparison results; and filter the target pixel using the particular offset value.

In still another form, one or more computer readable storage media are encoded with software comprising computer executable instructions and when the software is executed operable to perform operations comprising: receiving at a decoder from an encoder an encoded bit-stream representing video frames; for a target pixel in a block of a video frame represented by the encoded bit-stream, comparing a value of the target pixel with neighboring pixels to produce a plurality of comparison results; deriving a particular offset value for the target pixel based on the plurality of comparison results; and filtering the target pixel using the particular offset value.

In another form, a method is provided comprising: at an encoder, for a target pixel in a block of a video frame of a plurality of video frames, comparing a value of the target pixel with neighboring pixels to produce a plurality of comparison results; deriving a particular offset value for the target pixel based on the plurality of comparison results; filtering the target pixel using the particular offset value; and generating an encoded bit-stream based on the filtering.

In still another form, an apparatus is provided comprising a network interface unit configured to enable network communications; and a processor configured to: for a target pixel in a block of a video frame of a plurality of video frames, compare a value of the target pixel with neighboring pixels to produce a plurality of comparison results; derive a particular offset value for the target pixel based on the plurality of comparison results; filter the target pixel using the particular offset value; and generate an encoded bit-stream based on the filtering.

In yet another form, one or more computer readable storage media encoded with software comprising computer executable instructions and when the software is executed operable to perform operations comprising: for a target pixel in a block of a video frame of a plurality of video frames, comparing a value of the target pixel with neighboring pixels to produce a plurality of comparison results; deriving a particular offset value for the target pixel based on the plurality of comparison results; filtering the target pixel using the particular offset value; and generating an encoded bit-stream based on the filtering.

In still another form, a system is provided comprising a video encoder and a video decoder, where the video encoder is configured to: for a target pixel in a block of a video frame of a plurality of video frames, compare a value of the target pixel with neighboring pixels to produce a plurality of comparison results; derive a particular offset value for the target pixel based on the plurality of comparison results; filter the target pixel using the particular offset value; and generate an encoded bit-stream based on the filtering; and the video decoder is configured to: receive from the video encoder the encoded bit-stream representing video frames; for a target pixel in a block of a video frame represented by the encoded bit-stream, compare a value of the target pixel with neighboring pixels to produce a plurality of comparison results; derive a particular offset value for the target pixel based on the plurality of comparison results; and filter the target pixel using the particular offset value.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   receiving at a decoder from an encoder an encoded bit-stream representing video frames;
   for a target pixel in a block of a video frame represented by the encoded bit-stream, comparing a value of the target pixel with a plurality of neighboring pixels to produce a plurality of comparison results;
   determining a sum of comparison results between the value of the target pixel with a value of at least four neighboring pixels of the plurality of neighboring pixels;
   deriving a particular offset value for the target pixel based on the sum of comparison results between the value of the target pixel with the values of the at least four neighboring pixels, wherein the comparison results are based on any one of: greater than, less than, equal to, greater than or equal to, less than or equal to, wherein each comparison result is assigned a "1" or a "0" for purposes of computing the sum;
   wherein the particular offset value is derived by performing a computation according to the equation:

$$((B>X)+(D>X)+(E>X)+(G>X)>2)-((B<X)+(D<X)+(E<X)+(G<X)>2),$$

wherein X is the value of the target pixel and B, D, E and G are values for the at least four neighboring pixels above, to the left, to the right and below, respectively, the target pixel, wherein (Y>X) equals "1" if the value of pixel Y is greater than X and "0" otherwise, and (Y<X) equals "1" if the value of pixel Y is less than X and "0" otherwise, where Y is the value of pixels B, D, E and G, and ((B>X)+(D>X)+(E>X)+(G>X)>2) equals "1" if ((B>X)+(D>X)+(E>X)+(G>X)) is greater than 2 "0" otherwise, and ((B<X)+(D<X)+(E<X)+(G<X)>2) equals "1" if ((B<X)+(D<X)+(E<X)+(G<X)) is less than 2 and "0" otherwise; and
   filtering the target pixel using the particular offset value.

2. The method of claim 1, wherein deriving the offset value for the target pixel comprises generating an index into stored data of offset values based on the plurality of comparison results, and retrieving the particular offset value from the stored data using the index.

3. The method of claim 2, wherein generating the index comprises generating a multi-bit binary number, each bit of the binary number corresponding to a comparison result between the target pixel and a corresponding one of its neighboring pixels.

4. The method of claim 1, wherein
the particular offset value derived by the equation is configured to produce a positive offset value, a negative offset value, or "0".

5. The method of claim 2, further comprising:
storing data at the decoder for a plurality of sets of offset values;
receiving at the decoder from the encoder a signal that indicates which particular set of the plurality of sets of offset values to use.

6. The method of claim 2, further comprising:
storing data for a single set of offset values consisting of only 0's and 1's;
receiving at the decoder from the encoder a signal indicating a scale factor to be applied to the single set of offset values for use in filtering pixels.

7. The method of claim 1, and further comprising receiving from the encoder a signal that indicates to the decoder whether to filter at a frame level or at a block level or at both the frame level and the block level.

8. The method of claim 1, further comprising:
receiving from the encoder a signal based on an effectiveness of the offset values, wherein filtering is based on the signal received from the encoder.

9. The method of claim 7, wherein the signal sent from the encoder to the decoder is configured to disable the use of the filtering based on the stored data for certain types of block of video frames.

10. A method comprising:
at an encoder, for a target pixel in a block of a video frame of a plurality of video frames, comparing a value of the target pixel with a plurality of neighboring pixels to produce a plurality of comparison results;
determining a sum of comparison results between the value of the target pixel with a value of at least four neighboring pixels of the plurality of neighboring pixels;
deriving a particular offset value for the target pixel based on the sum of comparison results between the value of the target pixel with the values of the at least four neighboring pixels, wherein the comparison results are based on any one of: greater than, less than, equal to, greater than or equal to, less than or equal to, wherein each comparison result is assigned a "1" or a "0" for purposes of computing the sum;
wherein the particular offset value is derived by performing a computation according to the equation:

$$((B>X)+(D>X)+(E>X)+(G>X)>2)-((B<X)+(D<X)+(E<X)+(G<X)>2),$$

wherein X is the value of the target pixel and B, D, E and G are values for the at least four neighboring pixels above, to the left, to the right and below, respectively, the target pixel, wherein (Y>X) equals "1" if the value of pixel Y is greater than X and "0" otherwise, and (Y<X) equals "1" if the value of pixel Y is less than X and "0" otherwise, where Y is the value of pixels B, D, E and G, and ((B>X)+(D>X)+(E>X)+(G>X)>2) equals "1" if ((B>X)+(D>X)+(E>X)+(G>X)) is greater than 2 "0" otherwise, and ((B<X)+(D<X)+(E<X)+(G<X)>2) equals "1" if ((B<X)+(D<X)+(E<X)+(G<X)) is less than 2 and "0" otherwise;
filtering the target pixel using the particular offset value; and
generating an encoded bit-stream based on the filtering.

11. The method of claim 10, wherein deriving the particular offset value for the target pixel comprises generating an index into stored data of offset values based on the plurality of comparison results, and retrieving the particular offset value from the stored data using the index.

12. The method of claim 11, wherein generating the index comprises generating a multi-bit binary number, each bit of the binary number corresponding to a comparison result between the target pixel and a corresponding one of its neighboring pixels.

13. The method of claim 11, further comprising sending a signal sent from the encoder to a decoder indicating to the decoder which particular set of a plurality of sets of offset values the decoder is to use.

14. The method of claim 10, wherein the particular offset value derived by the equation is configured to produce a positive offset value, a negative offset value, or "0".

15. The method of claim 10, further comprising sending from the encoder to a decoder a signal that indicates to the decoder a scale factor to be applied to offset values for use in filtering pixels.

16. The method of claim 10, further comprising the encoder testing an effectiveness of the filtering, and sending from the encoder to a decoder a signal that is based on the effectiveness of the filtering.

17. The method of claim 16, wherein the signal sent from the encoder to the decoder is configured to disable the filtering at the decoder for certain block types based on the effectiveness determined at the encoder.

18. One or more non-transitory computer readable storage media encoded with software comprising computer executable instructions and when the software is executed operable to perform operations comprising:
receiving at a decoder from an encoder an encoded bit-stream representing video frames;
for a target pixel in a block of a video frame represented by the encoded bit-stream, comparing a value of the target pixel with a plurality of neighboring pixels to produce a plurality of comparison results;
determining a sum of comparison results between the value of the target pixel with a value of at least four neighboring pixels of the plurality of neighboring pixels;
deriving a particular offset value for the target pixel based on the sum of comparison results between the value of the target pixel with the values of the at least four neighboring pixels, wherein the comparison results are based on any one of: greater than, less than, equal to, greater than or equal to, less than or equal to, wherein each comparison result is assigned a "1" or a "0" for purposes of computing the sum;
wherein the particular offset value is derived by performing a computation according to the equation:

$$((B>X)+(D>X)+(E>X)+(G>X)>2)-((B<X)+(D<X)+(E<X)+(G<X)>2),$$

wherein X is the value of the target pixel and B, D, E and G are values for the at least four neighboring pixels above, to the left, to the right and below, respectively, the target pixel, wherein (Y>X) equals "1" if the value of pixel Y is greater than X and "0" otherwise, and (Y<X) equals "1" if the value of pixel Y is less than X and "0" otherwise, where Y is the value of pixels B, D, E and G, and ((B>X)+(D>X)+(E>X)+(G>X)>2) equals "1" if ((B>X)+(D>X)+(E>X)+

($G>X$)) is greater than 2 "0" otherwise, and (($B<X$)+($D<X$)+($E<X$)+($G<X$)>2) equals "1" if (($B<X$)+($D<X$)+($E<X$)+($G<X$)) is less than 2 and "0" otherwise; and filtering the target pixel using the particular offset value.

19. The non-transitory computer readable storage media of claim 18, wherein the instructions operable for deriving comprise instructions operable for generating an index into stored data of offset values based on the plurality of comparison results, and retrieving the particular offset value from the stored data using the index.

20. The non-transitory computer readable storage media of claim 19, wherein the instructions operable for generating the index comprise instructions for generating a multi-bit binary number, each bit of the binary number corresponding to a comparison result between the target pixel and a corresponding one of its neighboring pixels.

21. The non-transitory computer readable storage media of claim 18, wherein the particular offset value derived by the equation is configured to produce a positive offset value, a negative offset value, or "0".

22. The non-transitory computer readable storage media of claim 18, wherein the instructions are further operable to perform operations comprising receiving from the encoder at the decoder a signal that indicates to the decoder a scale factor to be applied to offset values for use in filtering pixels.

23. The non-transitory computer readable storage media of claim 18, wherein the instructions are further operable to perform operations comprising receiving from the encoder at the decoder a signal that is based on an effectiveness of the filtering.

24. The non-transitory computer readable storage media of claim 23, wherein the signal received from the encoder at the decoder is configured to disable the filtering at the decoder for certain block types based on the effectiveness determined at the encoder.

* * * * *